United States Patent [19]

Auras

[11] Patent Number: 4,824,202
[45] Date of Patent: Apr. 25, 1989

[54] FIBER OPTIC CONNECTOR

[75] Inventor: Alain G. Auras, Oakland, Calif.

[73] Assignee: Alcon Laboratories, Inc., Fort Worth, Tex.

[21] Appl. No.: 84,995

[22] Filed: Aug. 12, 1987

[51] Int. Cl.⁴ .................................................. G02B 5/14
[52] U.S. Cl. ................................. 350/96.18; 350/96.20
[58] Field of Search ................ 350/96.18, 96.20, 96.21

[56] References Cited

U.S. PATENT DOCUMENTS

| | | | |
|---|---|---|---|
| 3,950,075 | 4/1976 | Cook et al. | 350/96.18 |
| 4,265,511 | 5/1981 | Nicia et al. | 350/96.18 |
| 4,451,115 | 5/1984 | Nicia et al. | 350/96.18 |

Primary Examiner—James W. Davie
Attorney, Agent, or Firm—Irell & Manella

[57] ABSTRACT

An assembly for optically coupling a light source and an optical waveguide having an axis of optical transmission and a generally planar end face. A connector encloses the end of the optical waveguide with the end face of the optical waveguide exposed. A housing positionable adjacent the light source defines a chamber extending along a light transmission axis and sized to receive the connector with the optical and light transmission axes coaxial. The connector is supported in the chamber in a first predetermined position by spring-biased ball plungers mounted to the housing. The balls anchor in a groove extending circumferentially in the outer surface of the connector. A lens cap has a sleeve in which the connector is received. An end of the sleeve is closed except for an opening supporting a spherical lens. The lens cap slides within the housing chamber along the axis with the end of the connector contacting the lens cap adjacent the lens opening. In this position, the end face of the waveguide is tangential with the lens surface. A resilient washer is interposed the housing and the lens cap for yieldably urging the lens cap toward the connector.

18 Claims, 1 Drawing Sheet

[4,824,202]

FIBER OPTIC CONNECTOR

FIELD OF THE INVENTION

This invention relates to connectors for coupling an optical waveguide to a light source. More particularly, it relates to such connectors for aligning a waveguide with a lens.

BACKGROUND OF THE INVENTION

Optical waveguides, particularly fiber optical bundles have received widespread use in a variety of applications. Common among these are uses in communication and medicine. In such applications, it is desirable to orient a fiber optical bundle with a light source, and in particular with a lens which concentrates or focuses light along an axis. For instance, optimum light transmission has been found to occur when the planar face of an optical bundle is placed adjacent to a spherical lens so that the face of the lens forms a tangent to the surface of the lens.

This structure has been accomplished conventionally by mounting the optical fiber in a mounting which fixes the optical fiber to the lens, preventing subsequent relative shifting between them. However, it is desirable to interchange optical waveguides with light sources. With the fixed structure, this is not possible without tearing apart an existing coupling and rebuilding it with substituted parts. This is an expensive and time consuming solution.

A preferred solution is to make the waveguide removable relative to the light source and/or lens. An example of one such device is disclosed in U.S. Pat. No. 3,950,075, entitled "Light Source for Optical Waveguide Bundle", naming Cook et al. as inventors. Cook et al. disclose an optical fiber bundle mounted in a termination ferrule which exposes the planar face of the optical bundle. A flange on the ferrule is used to secure the bundle into a light-source containing housing. In this housing a resilient sleeve receives the ferrule in a manner sandwiching a spherical lens between the fiber optic bundle face and a window adjacent the light source. Optionally, a window may be placed between the lens and the optical bundle face.

The Cook et al. connector is intended for relatively permanent installation since it would be difficult to insert and remove the ferrule from the resilient sleeve. Further, the face of the bundle physically contacts the lens or the window. Such contact, if repeated, would quickly fracture the optical bundle adjacent the face, deteriorating its light transmitting capabilities.

SUMMARY OF THE INVENTION

The present invention overcomes these disadvantages of the prior art. In particular, the present invention provides a connector which supports a fiber bundle in a predetermined position relative to a lens without allowing the fiber bundle to contact the lens. The invention also preferably provides a connector which is quickly and easily interchanged without damaging the bundle face.

These advantages are provided by a specially adapted connector assembly for physically supporting an optical waveguide and for optically coupling it to a light source. The optical waveguide has an axis of optical transmission and a generally planar end face. The end of the optical waveguide is supported by said specially adapted connector with an end face of the optical waveguide exposed but supported such that the end face of the bundle barely contacts the spherical lens. A receptacle portion of said specially adapted connector assembly is positionable adjacent the light source and includes a housing, a lens, a lens support member, and a resilient member. The specially adapted connector assembly also preferably includes a male end portion which surrounds and supports the optical waveguide. In the preferred embodiment, the optical waveguide is comprised of a bundle of fiber optic lightguides. The receptacle defines a chamber for receiving the male end portion of said connector assembly and engaging said male end in a manner for maximizing the efficiency of coupling of light from the light source to the end face of the optical waveguide while minimizing damage to the optical fiber.

The lens support member is disposed in the chamber, is movable relative to the housing, and has an opening in which the lens is supported. The lens is preferably spherical and supported in the opening with the surface of the lens adjacent and tangent to the waveguide end face. The resilient member is interposed between the housing and the lens support member for accommodating movement of the lens support member relative to the housing when the waveguide end is positioned in the chamber. The male end portion of the connector assembly engages the lens support assembly but not the lens itself when the male end portion is locked into position in the receptacle. Excess force of engagement by the male end portion to the lens support member is absorbed by the resilient member and not by either the lens or the end face of the fiber optic bundle.

The structure of an assembly made according to the invention has the particular advantage of supporting the waveguide or fiber bundle end face in a desired position without putting excessive pressure on the bundle face. These and other features and advantages will be more clearly understood from a review of the drawings and the following detailed description of the preferred embodiment.

DETAILED DESCRIPTION OF THE PREFERRED EMBODIMENT

Figure 1:
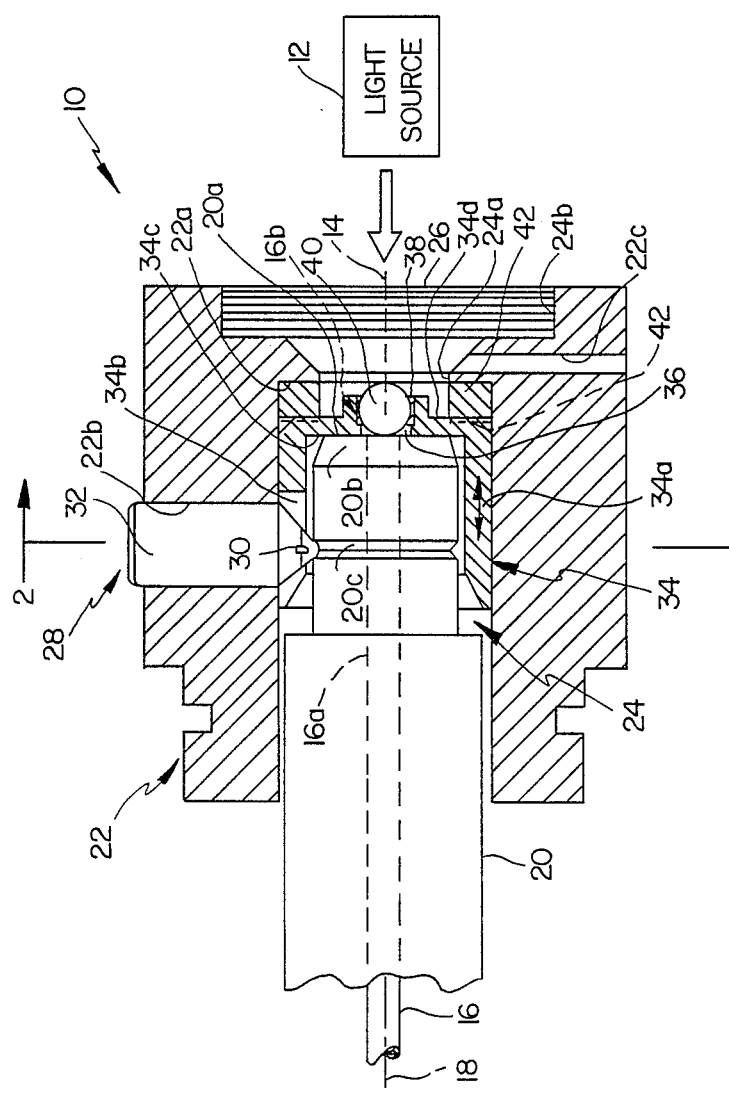
FIG. 1 is a side cross-sectional view of an optical waveguide assembly made according to the present invention.

Referring initially to FIG. 1, an optical waveguide connector assembly 10 made according to the invention is shown adjacent a light source 12 which directs light into the assembly along a light transmission axis 14 and into an optical waveguide, such as a fiber optic waveguide bundle 16 having an axis of optical transmission 18 coaxial with axis 14.

Fiber bundle 16 has an end 16a with a generally planar end face 16b adjacent to a spherical lens 40. End 16a is encased in a male end portion or sleeve 20, also referred to as an insert member. Sleeve 20 is made of a suitably rigid material, such as brass, stainless steel or other corrosion resistant autoclavable material. An end face 20a of the sleeve is preferably flush with end face 16b, although it will become apparent that other relative arrangements are also acceptable. Sleeve 20 is generally cylindrical, conforming to the preferred shape of bundle 16. The end 20a of the sleeve is also beveled at 20b and has a circumferential groove 20c spaced from end face 20a.

A housing or connector body 22 forming the receptacle portion of the connector and preferably made of aluminum, has an internal, generally cylindrical chamber 24 extending through it along axis 14. Chamber 24 is sized t receive sleeve 20, as shown. Body 22 includes a shoulder having a surface 22a facing sleeve 20 and defining a reduced diameter aperture 24a. The aperture flares to the right as viewed in the figure to an enlarged aperture 24b in which is mounted, such as by a suitable adhesive, a filter 26. Filter 26 is a wide band hot mirror filter preferably made of pyrex, such as provided by Optical Coating Laboratory, Inc. of Santa Rosa, Calif. Between apertures 24a and 24b is a vent 22c in body 22 which vents that region of chamber 24.

Figure 2:
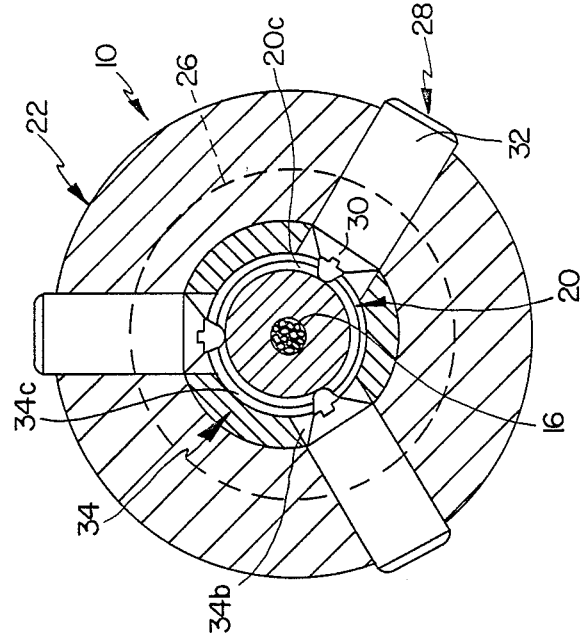
FIG. 2 is a cross-sectional view taken along line 2—2 in FIG. 1.

Referring also to FIG. 2, sleeve 20 is supported and maintained in alignment by three spring-biased ball plungers 28 disposed symmetrically about chamber 24. Each plunger has a ball 30 held in position by a spring (not shown) in a plunger body 32. Body 32 is preferably externally threaded and screwed into mating threads in bores 22b extending through body 22. These are fixed in position by a suitable thread locking compound so that the three balls seat in groove 20c with the ball springs being sufficiently strong to support bundle end 16a and sleeve 20.

The end of sleeve 20 is enclosed in a lens cap 34 which serves as a lens support member. Cap 34, preferably made of brass, includes a cylindrical sleeve 34a having cutouts 34b sized to allow plungers 28 to extend into chamber 24 to contact sleeve 20. Cap 34 is slidable in chamber 24 along axis 14. The end of lens cap 34 adjacent end face 20a of sleeve 20 forms a shoulder having generally planar surface 34c against which end face 20a presses. The shoulder terminates in a lens opening 36 sized to receive a cylindrical lens insert 38 and a spherical lens 40. Insert 38 is made of a resilient material, such as teflon, and has a slightly smaller inner diameter than the lens so that the lens seats securely in it. The lens is preferably made of amorphous glass or other noncrystaline material in order to avoid having to orient it during installation. It is also preferred that the lens have an index of refraction of approximately 1.76 and have a diameter about twice the diameter of the bundle.

The lens is placed so that planar surface 20a of sleeve 20 is tangential with the surface of the lens. By positioning optical bundle end face 16b coplanar with surface 20a it also forms a tangent with the lens surface. This has been found to be the optimum orientation of the lens and optical bundle end face in order to maximize the concentration of light from light source 12 in the bundle. Lens 40 should be placed at the light source focal point, such as at the focal length of a lamp reflector (not shown)

Lens cap 34 terminates to the right in FIG. 1 in a generally planar surface 34d facing body surface 22a Sandwiched between these two surfaces is a washer 42 preferably made of a suitably resilient material such as silicone rubber or a fluorocarbon so as to be autoclavable.

In its relaxed state, when sleeve 20 and bundle 16 are not disposed in chamber 24, washer 42 has a position as shown by the phantom lines. When sleeve 20 is inserted into the chamber, balls 30 are displaced in plungers 28 by bevel edge 20b. Before the balls seat completely in groove 20, surface 20a of sleeve 20 contacts surface 34c of lens cap 34. The lens cap 34 is then forced to the right as shown in FIG. 1 until washer 42 is compressed to the position shown in solid lines in FIG. 1 or sufficiently compressed to allow the balls to seat in the groove 20c. The pressure of the springs in the plungers is sufficient to maintain the position of sleeve 20 against the force of compressed washer 42.

As has been described, this positions the end face of optical fiber bundle 16 at a tangent with the spherical surface of lens 40. In other words, the lens is just contiguous with the end face. However, the force applied to connect the fiber bundle with the lens and light source is applied between the support structures for the bundle and lens, not directly through the lens and bundle.

Further, it can be seen that the bundle and lens receptacle are readily separated simply by pulling them apart. Correspondingly, they are easily connected by pushing sleeve 20 into chamber 24 without concern that destructive forces are being applied to the end face of the fiber optic bundle. It is thus possible to quickly and readily replace or interchange different optical waveguides with a given light source.

It will be appreciated that although the invention has been described with specific reference to a preferred embodiment, other variations in the form and detail of the structure may be made without varying from the spirit and scope of the invention as described in the claims.

What I claim is:

1. An assembly for optically coupling a light source and an optical waveguide having an axis of optical transmission and a generally planar end face comprising:
   a housing defining a chamber for receiving the end of such a waveguide and for transmitting light from the light source toward the waveguide end face;
   means for supporting the end of a waveguide received in said chamber in a first predetermined position;
   a lens;
   means movable relative to said housing for supporting said lens in said chamber in a second predetermined position relative to a waveguide end supported in said first position for directing light passing from the light source toward the end face of the optical waveguide; and
   resilient means interposed between said housing and said lens supporting means for yieldably urging said lens toward a waveguide end supported in said first position.

2. An assembly according to claim 1 wherein said waveguide-end-supporting means, said lens supporting means, and said resilient means are structured so that said resilient means yieldably urges said lens-supporting means toward said waveguide-end-supporting means when said waveguide-end-supporting means is supporting a waveguide with the end face in said first position.

3. An assembly according to claim 1 wherein the surface of said lens is tangent to the waveguide-end face when said waveguide and lens are in said respective first and second positions.

4. An assembly according to claim 3 wherein said lens is a spherical lens.

5. An assembly according to claim 1 wherein said light source transmits light through said chamber along an axis of light transmission, said assembly further comprising means for aligning said waveguide-end-supporting means with the axis of optical transmission positioned coaxially with the axis of light transmission.

6. An assembly according to claim 5 wherein said waveguide end supporting means comprises said aligning means.

7. An assembly according to claim 1 wherein said lens supporting means includes a lens support member having an aperture in which said lens is supported, said lens support member having a surface facing a waveguide supported in said chamber, and said waveguide-end-supporting means has a surface facing said lens-support member waveguide-facing surface, said lens-support-member surface contacting said lens-facing surface of said waveguide-end-supporting means when said lens is in said second position.

8. An assembly according to claim 7 wherein said lens-supporting means includes a sleeve extending from said lens support member and enclosing the end of a waveguide supported in said chamber.

9. An assembly according to claim 1 wherein said waveguide-end-supporting means includes a connector sleeve mounted fixedly onto an end of a waveguide with the end face exposed, and indent/detent means interposed said housing and said connector sleeve for supporting said connector sleeve in said first position.

10. An assembly according to claim 9 wherein said indent means is a groove extending circumferentially around said connector sleeve and said detent means includes a spring-loaded ball plunger mounted to said housing.

11. An assembly according to claim 10 wherein said detent means includes a sufficient plurality of said detent means to fully support said connector sleeve in said chamber.

12. An assembly for optically coupling a light source and an optical waveguide having an axis of optical transmission and a generally planar end face comprising:
an insert member enclosing and attached to the end of the optical waveguide with an end face of the optical waveguide exposed;
a housing positionable adjacent the light source and defining a chamber extending along a light transmission axis, said chamber being sized to receive said insert member;
means for supporting said insert member received in said chamber in a first predetermined position;
a lens support member disposed in said chamber adjacent the end of an insert member received in said chamber, movable along said axis relative to said housing, and having an opening disposed along said axis, said insert member contacting said lens support member when said insert member is disposed in said first position;
a lens supported in said opening for directing light passing from the light source, through said chamber and opening, and into said optical waveguide through said end face, said lens being supported in said opening with the surface of said lens in a second predetermined position relative to the waveguide-end face when said insert member is in said first position; and
resilient means interposed said housing and said lens support member for yieldably urging said lens-support member relative to said housing toward said insert member when said insert member is in said first position.

13. An assembly according to claim 12 wherein said second position is a position with the surface of said lens tangent to the waveguide-end face.

14. An assembly according to claim 13 wherein said lens is a spherical lens.

15. An assembly according to claim 12 wherein said insert member includes a connector sleeve mounted fixedly onto an end of a waveguide, and indent/detent means interposed said housing and said connector sleeve.

16. An assembly according to claim 15 wherein said indent means is a groove extending circumferentially around said connector sleeve and said detent means includes a spring-loaded ball plunger mounted to said housing.

17. An assembly according to claim 16 wherein said detent means includes a sufficient plurality of said detent means to fully support said connector sleeve in said chamber and align the waveguide along said axis.

18. A connector for holding an optical waveguide in a predetermined position relative to a lens comprising:
an optical waveguide having an end face;
a lens having a rounded surface;
means for holding said end face of said optical waveguide tangential to said rounded surface while preventing substantial force from being transmitted to said lens through said lens end face, said holding means comprising a lens support member for slidably receiving said optical waveguide and for supporting said lens and further comprising a resilient washer for yieldably resisting positioning of said optical waveguide adjacent said lens surface and further comprising means for maintaining said optical waveguide in a predetermined position such that said end face is tangential to said lens surface, wherein said maintaining means is configured so as to prevent said waveguide from sliding relative to said lens support member when said end face is tangential to said lens.

* * * * *

UNITED STATES PATENT AND TRADEMARK OFFICE
CERTIFICATE OF CORRECTION

PATENT NO. : 4,824,202

DATED : April 25, 1989

INVENTOR(S) : Alain G. Auras

It is certified that error appears in the above-identified patent and that said Letters Patent is hereby corrected as shown below:

At Column 2, line 45, after "waveguide" insert --connector--.

At Column 3, line 8, change "t" to --to--.

At Column 3, line 58, after "22a" insert a period --.--.

Signed and Sealed this

Twenty-first Day of January, 1992

Attest:

HARRY F. MANBECK, JR.

*Attesting Officer*  *Commissioner of Patents and Trademarks*